United States Patent
Navarra Pruna

(10) Patent No.: US 11,926,083 B2
(45) Date of Patent: Mar. 12, 2024

(54) DATING SYSTEM FOR MOLDS

(71) Applicant: COMERCIAL DE UTILES Y MOLDES, S.A., Barcelona (ES)

(72) Inventor: Alberto Navarra Pruna, Barcelona (ES)

(73) Assignee: COMERCIAL DE UTILES Y MOLDES, S.A., Barcelona (ES)

( * ) Notice: Subject to any disclaimer, the term of this patent is extended or adjusted under 35 U.S.C. 154(b) by 0 days.

(21) Appl. No.: 17/090,505

(22) Filed: Nov. 5, 2020

(65) Prior Publication Data

US 2021/0129401 A1 May 6, 2021

(30) Foreign Application Priority Data

Nov. 6, 2019 (ES) ................. ES201930968

(51) Int. Cl.
*B29C 45/37* (2006.01)
(52) U.S. Cl.
CPC ................... *B29C 45/374* (2013.01)
(58) Field of Classification Search
CPC ......... B29C 45/374; B29C 17/03; B41K 1/56; B41K 1/363
USPC .................................. 425/195, 388
See application file for complete search history.

(56) References Cited

U.S. PATENT DOCUMENTS

| | | | | |
|---|---|---|---|---|
| 1,823,585 A * | 9/1931 | Burdick | ............... | G08B 3/1008 341/22 |
| 4,379,687 A * | 4/1983 | Wilson | ................. | B29C 33/306 249/103 |
| 5,234,326 A * | 8/1993 | Galli | .................. | B29D 30/0629 425/46 |
| 5,318,418 A * | 6/1994 | Netto | ..................... | B29C 45/374 425/185 |
| 5,816,160 A * | 10/1998 | Taira | ........................ | B41K 1/04 101/382.1 |
| 6,722,273 B1 * | 4/2004 | Navarra Pruna | ..... | B29C 45/374 425/185 |

(Continued)

FOREIGN PATENT DOCUMENTS

| | | | |
|---|---|---|---|
| CH | 679917 A5 | 5/1992 | |
| EP | 914921 A1 * | 5/1999 | ............. B29C 43/18 |

(Continued)

OTHER PUBLICATIONS

Machine translation ES2353171 (Year: 2011).*
Machine translation EP0914921A1 (Year: 1999).*
Machine translation JP2006001224A (Year: 2006).*

*Primary Examiner* — Jacob T Minskey
*Assistant Examiner* — Wayne K. Swier

(57) ABSTRACT

The dating system for molds comprises a marking element (1) that engraves a determined date; wherein said marking element (1) comprises interchangeable inserts (2) indicating said determined date, said determined date being defined by letters and/or numbers, forming a line. It permits to obtain the advantages of: the reading of the information is much clearer than the traditional date stamps; it requires a minimum space, which allows to adapt it to practically any mold; and it is much more dynamic than traditional daters, as it can provide date information in multiple formats, such as day and month, or week and year number, or combinations thereof.

18 Claims, 4 Drawing Sheets

(56) References Cited

U.S. PATENT DOCUMENTS

| | | | |
|---|---|---|---|
| 6,889,954 B2* | 5/2005 | Navarra Pruna | B29C 33/428 |
| | | | 249/103 |
| 2006/0272519 A1* | 12/2006 | Uratani | B29C 33/424 |
| | | | 101/4 |
| 2011/0204542 A1* | 8/2011 | Flach | F03D 13/10 |
| | | | 264/154 |
| 2012/0031292 A1* | 2/2012 | Ruskofsky | B41K 1/04 |
| | | | 101/405 |

FOREIGN PATENT DOCUMENTS

| | | | |
|---|---|---|---|
| ES | 2353171 A1 * | 2/2011 | |
| ES | 2353171 A1 | 2/2011 | |
| JP | 2006001224 A * | 1/2006 | |
| WO | WO9627490 A1 | 9/1996 | |

* cited by examiner

DATING SYSTEM FOR MOLDS

The present invention relates to a dating system for molds.

BACKGROUND OF THE INVENTION

In the manufacture of plastic parts by injection, it is common to mark the manufacturing date on the injected part to know at all times the real traceability of the production process and to know the complete history, both of the material used and the guarantee of its origin.

For this purpose, it is usual that the date is marked in relief at the moment of injection.

For this, there are different models of markers, which are engraved with different numbers arranged on a cylinder that has the numbers engraved on the circular perimeter depending on whether you want to engrave the day, week, month, year, etc.

For example, in the month and year model, the numbers from 1 to 12 are engraved on the perimeter, as a clock, and inside this same cylinder, and so that it can rotate on its own axis, it carries another smaller diameter cylinder that includes an arrow to indicate the number of the day.

The particularity of this arrow is that it is engraved in low relief with the necessary depth so that it can be turned by using a screwdriver, to indicate the position of the desired number.

As the arrows are deep enough for the screwdriver, the markers are not suitable for thin plastic parts, as well as picking up dirt in the arrow area over time.

There are markers with the numbers in high relief, but to be able to manipulate them, the arrow is also in low relief, so they lose their functionality.

In addition, in the event that the marker indicates 12 months, it is common that the same cylinder with a smaller diameter includes the last digits of the corresponding year, in which case at the end of the year the complete cylinder with a smaller diameter must be replaced by a new one that corresponds to the new year.

In all cases, the use of a screwdriver is unavoidable to rotate the central shaft so that the arrow indicates the corresponding number.

The marker cylinders are undoubtedly small in diameter, as they must be inserted into some part of the mold that corresponds to the surface of the figure, any part of the punch of the mold being normally suitable.

To change the date of the month or day, the injection of the part must be stopped to turn the indicator arrow with a screwdriver, while to change the year, production must be stopped for as long as necessary to proceed to change the corresponding cylinder.

If additional information is required in addition to the month and year, it is usual to use more markers, to mark in the same injection process all the information that the product may require.

In any case, the momentary stoppage of production is essential, as well as the opening of the mold so that the operator can proceed to rotate the arrow, both for a single marker and for several markers.

If the mold has one or more cavities, due to the location of the markers it is possible to require a certain specialization and screwdrivers suitable for the size of the rotary shaft slot.

In these cases, sometimes due to lack of skill of the operator, poor visibility due to the position of the marker or misuse of the screwdriver, damage occurs to the mold, or the position of the arrow(s) is incorrectly marked and the parts are marked with wrong data.

Consequently, changing the marker data becomes an uncomfortable task and it is foreseeable that the part will not be controlled as required by the product requirements and it is practically impossible for all the parts to reflect the veracity of the data that is stipulated as a guarantee of manufacturing control.

Another drawback of conventional mold markers is that the information they provide is limited and it can be confusing at times.

This is because the information varies depending on the orientation of the arrow, and this arrow can be difficult to see.

Furthermore, the information that can be provided is limited, usually month and year, occupying a considerable space in the piece, since all the months of the year are included, and the arrow is oriented towards one of them.

DISCLOSURE OF THE INVENTION

Therefore, an objective of the present invention is to provide a dating system for molds that allows the information to be read much more clearly on the part.

With the dating system for molds of the invention said disadvantages are solved, presenting other advantages that will be described below.

The reason for the present invention is to completely change the geometry of the dating systems for molds, and instead of being circular with an arrow that indicates only one of the information in the circle, the dating system of the present invention only includes the date information, for example the month and year, preferably in a linear arrangement, i.e. indicating the date with letters and/or numbers forming a line.

The dating system according to the present invention is a new traceability element that allows the marking of the date of manufacture with extreme precision, with minimal dimensions and with an unprecedented reading quality in the marking of the date on the plastic parts, an issue of vital importance for production control.

The dating system for molds according to the present invention comprises a marking element that engraves a determined date, wherein said marking element comprises a plurality of interchangeable inserts that indicate the determined date, said determined date being defined by letters and/or numbers.

Preferably, said letters and/or numbers are arranged in a line, and said letters and/or numbers indicate, for example, a day number, a month, a week number and/or a year.

Advantageously, said interchangeable inserts are removably mounted on a support, and said support preferably comprises a housing provided with a locking element, to lock said inserts in position, and according to a preferred embodiment, said housing extends to the end the support furthest from the axis.

Preferably, said locking element is located centrally in said housing, leaving two through holes on its sides.

Advantageously, said inserts comprise a cavity complementary to said locking element. For example, such a cavity has a trapezium-shaped profile, although it could be any suitable shape.

According to a preferred embodiment, the marking element comprises two or more interchangeable inserts.

The dating system for molds according to the present invention also preferably comprises a manipulation tool for placing and removing said interchangeable inserts.

According to a preferred embodiment, said manipulation tool comprises a recess for one or more interchangeable inserts and a stop for retaining said interchangeable inserts in said recess.

Furthermore, the dating system for molds according to the present invention also preferably comprises an insert storage element, in which the inserts that are not currently used in the mold are placed.

According to a preferred embodiment, said storage element comprises a storage area with a profile complementary to the cavity of each insert.

Advantageously, the locking element, the handling tool and/or the storage element comprises one or more magnets duly polarized to prevent accidental loss of the interchangeable inserts and to fix them in their proper position.

Furthermore, said marking element is movable between a position of use and a position of removal and placement of the interchangeable inserts, thanks to the axis.

With the dating system for molds according to the present invention, at least the following advantages are achieved, among others:

The reading of the information is much clearer than traditional daters;

It requires a minimum space, which allows it to be adapted to practically any mold;

It is much more dynamic than traditional daters, as they can provide date information in multiple formats, such as day and month, or week and year number, or combinations thereof.

In addition, it allows the part not to present any protrusion, ensuring a completely sharp and functional appearance, which is especially important in parts whose walls are very thin, for example, in the cosmetic or pharmaceutical industry.

BRIEF DESCRIPTION OF THE DRAWINGS

For better understanding of what has been disclosed, some drawings in which, schematically and only by way of a non-limiting example, a practical case of embodiment is shown.

DESCRIPTION OF A PREFERRED EMBODIMENT

Figure 1:
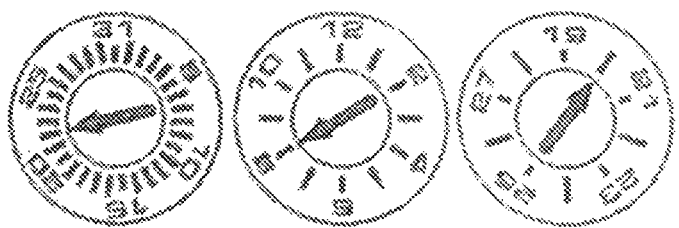
FIG. 1 is a comparison of a date indicated with a conventional dater and a date indicated with the dating system according to the present invention, where the differences in reading can be appreciated.
Figure 2:
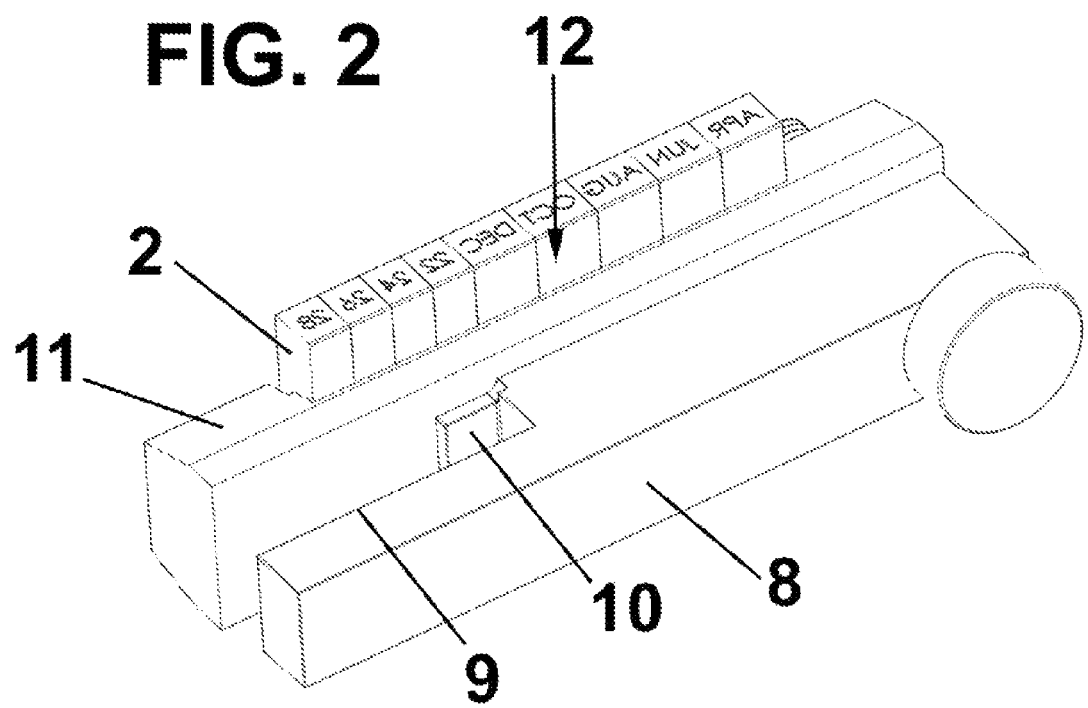
FIG. 2 is a perspective view of the handling tool and the storage element of the dating system according to the present invention.

As indicated above and as shown in FIG. 1, the dating system of the present invention completely changes the geometry of the mold dating systems, and instead of being circular with an arrow pointing only to one of the information of the circle (on the right in FIG. 1), the dating system of the present invention only includes the information of the date, for example, the month and year (on the left in FIG. 1), preferably in a linear arrangement, that is, indicating the date with letters and/or numbers forming a line.

For this, the dating system for molds according to the present invention comprises a marking element 1 that engraves a date on a part that is molded in the mold.

Said date indicates the date of manufacture of the part that is molded made up of letters and/or numbers, which can include the month and the year, or the day, the month and the year, or the number of the week and the year, or any combination of such information to provide the date.

Preferably, said letters and/or numbers are arranged in a line, and only includes information on a certain date, unlike conventional date stamps that include all the days of a month or all the months of a year and an arrow indicates the date that you want to indicate.

It should be noted that for the sake of simplicity an embodiment of the marker according to the present invention comprising a single marking element is shown, but the number of marking elements will be adequate to provide the desired information. The marking element 1 comprises two or more interchangeable inserts 2 provided with the desired information, for example, the month and the year. Said information is preferably engraved at both ends.

Figure 5:
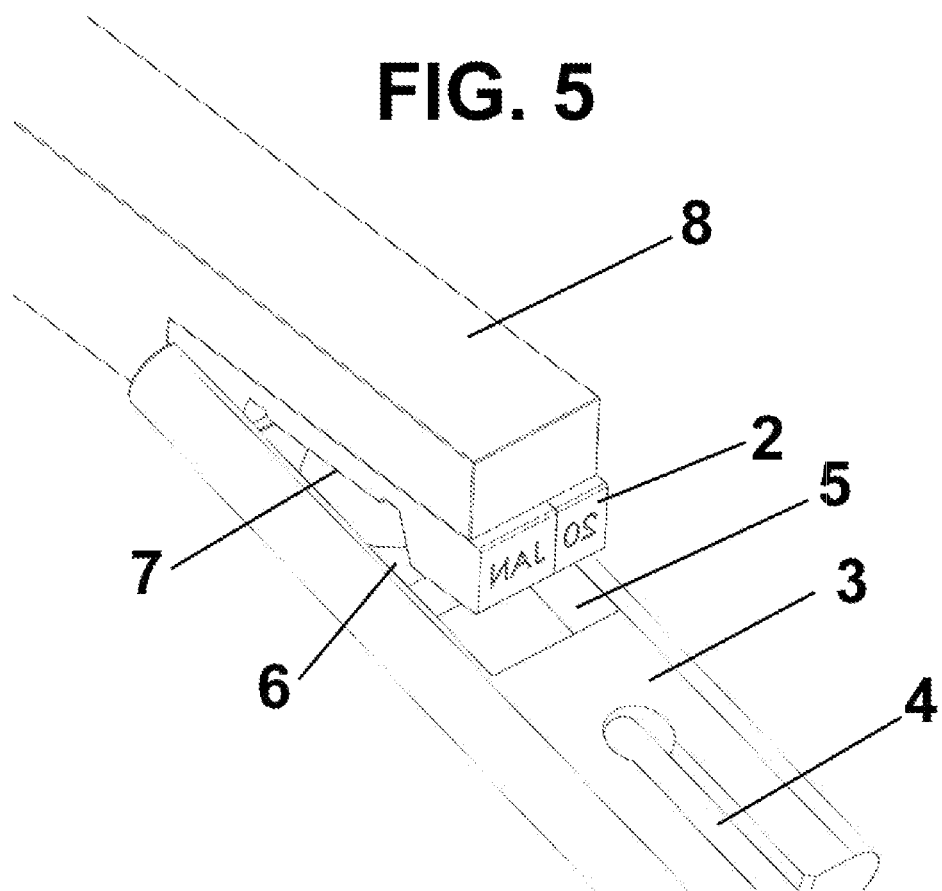
Figure 6:
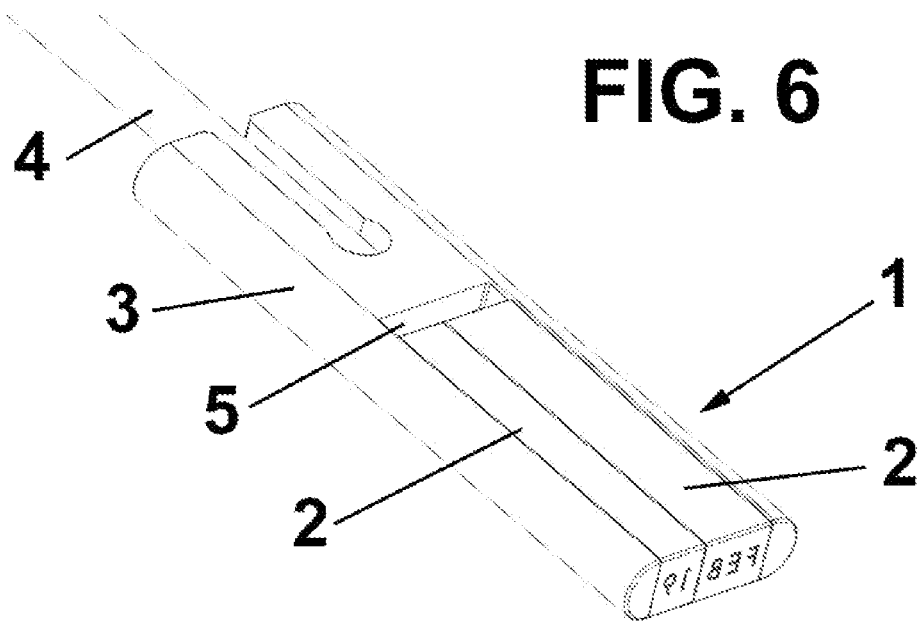
FIG. 6 is a perspective view of the marking element of the dating system according to the present invention.

The marking element 1, at its front end, defines a substantially rectangular profile radiated at its ends to facilitate the machining of the mold, with a certain height, as can be seen in FIG. 5.

Said interchangeable inserts 2 are removably mounted on a support 3, which is mounted at the end of a shaft 4.

For the assembly of the interchangeable inserts 2, said support 3 comprises an inverted U-shaped housing 5 that defines a locking element 6. According to the embodiment shown, said housing 5 extends from one end of the support 3 and the locking element 6 is positioned in a middle position of the housing 5, so that two through holes are defined on each side of the locking element 6.

So that the inserts 2 are retained in said housing 5, each insert 2 comprises a cavity 7 with a shape complementary to the shape of the locking element 6. For example, according to the embodiment shown, the cavity 7 has a trapezium-shaped profile.

Furthermore, said locking element 6 advantageously comprises one or more magnets, which retain the interchangeable inserts 2 in position.

For removal and placement, the dating system according to the present invention comprises a handling tool 8, which includes a recess 9 for the placement of two or more inserts 2 and a stop 10 to retain the insert(s) 2 in position in said recess 9.

This handling tool 8 also comprises one or more magnets to retain the interchangeable inserts 2 in position and prevent accidental loss of the inserts 2.

The dating system according to the present invention also comprises a storage element 11 for storing in an organized manner a series of inserts 2 that are not used at that time.

This storage element 11 comprises a storage zone 12 where a plurality of inserts 2 placed side by side are placed, and said storage element 11 also comprises one or more magnets to retain the interchangeable inserts 2 in position and prevent an accidental loss of the inserts 2.

The process of placing two inserts 2 in their position of use in the support 3 is shown in the figures.

In FIG. 1, the handling tool 8 and the storage element 11 are connected to each other. Once separated, the inserts 2 can be removed from the storage element 11 using the handling tool 8.

Figure 3:
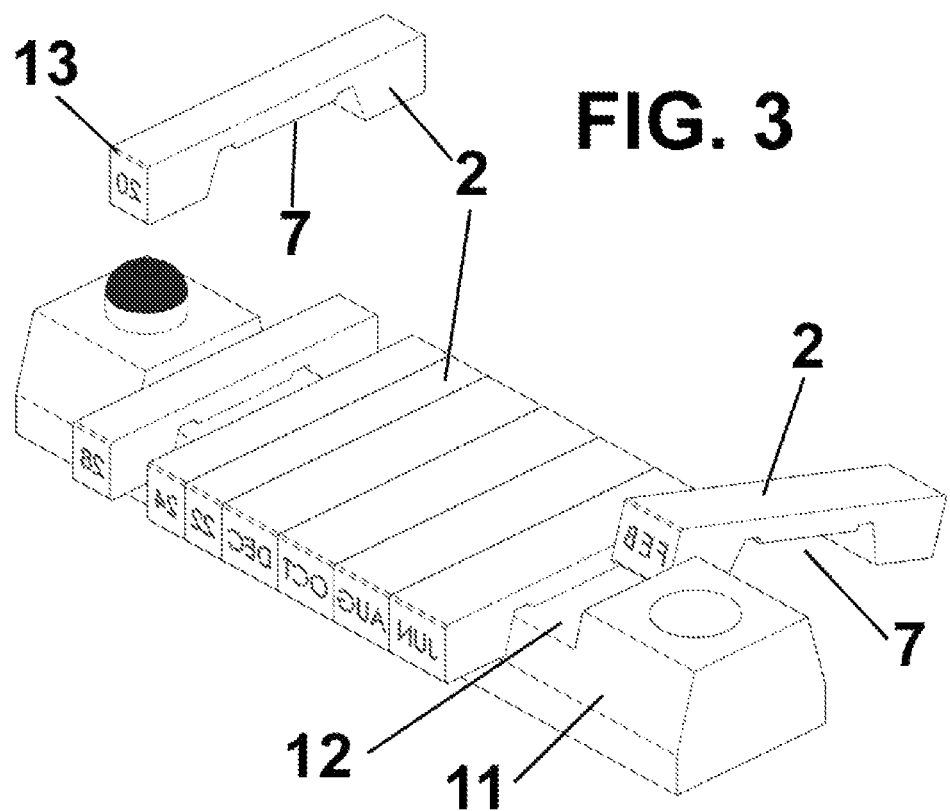
FIG. 3 is a perspective view of the storage element of the dating system according to the present invention.

For their placement in the support 3, the inserts 2 can be placed in position in the recess 9 of the handling tool 8, as shown in FIG. 3.

Figure 4:
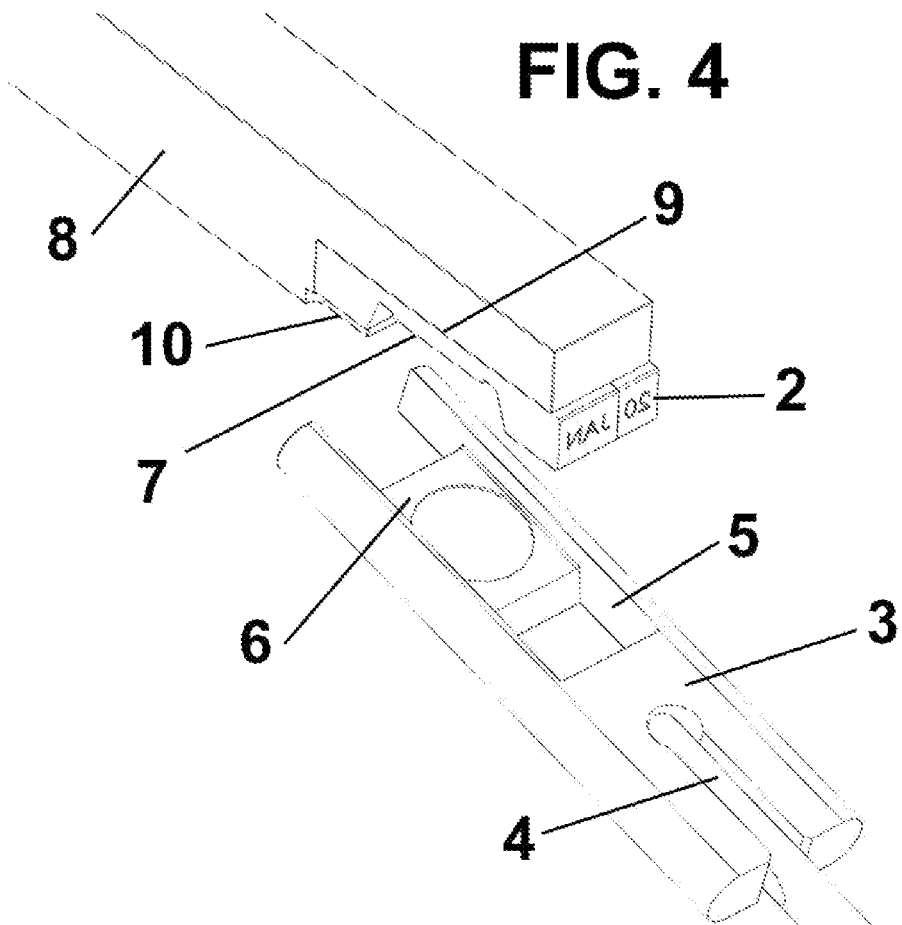
FIGS. 4 and 5 show the process of placing two interchangeable inserts with the aid of the manipulation tool of the dating system according to the present invention.

Once placed in their position, the inserts 2 are deposited in said housing 5, as shown in FIG. 4, with the help of the handling tool 8.

When the inserts 2 have been placed in the support 3, the handling tool 8 is removed and the inserts 2 are left in their position of use, as shown in FIG. 5.

To remove the inserts 2, a reverse process is carried out to the placement process described above.

For the dating of a part, the marking element 1 is moved to the appropriate position in the mold (not shown in the figures), specifically in a position that protrudes slightly from the punch of the mold. To do this, the inserts 2 of the marking element 1 comprise chamfers 13, corresponding to the protruding position of the marking element 1. One of the chamfers is indicated in FIG. 3, which acts as a ramp to avoid possible misalignment during assembly.

The shaft 4 makes it possible to place the marking element 1 in a position of use or in a position for inserting and removing the inserts. This movement through the shaft 4 can be driven in any suitable way, for example by means of a pneumatic piston.

In the position of inserting and removing the inserts, the marking element 1 comes out of its housing in the mold, for example, half its height, and once the inserts have been changed, the marking element 1 returns to its position of use.

Although reference has been made to specific embodiments of the invention, it is apparent to a person skilled in the art that the described dating system for molds is susceptible of numerous variations and modifications, and that all the details mentioned can be replaced by other technically equivalents, without departing from the scope of protection defined by the appended claims.

The invention claimed is:

1. A dating system for molds, comprising:
a marking element that engraves a determined date, said marking element comprising interchangeable inserts that indicate said determined date, said determined date being defined by letters and/or numbers, forming a line; and
a handling tool to place said interchangeable inserts into a support of said marking element by separating said interchangeable inserts from the handling tool and to remove said interchangeable inserts from the support of said marking element, the handling tool being formed separately from a mold, said handling tool comprising a recess for placing one or more interchangeable inserts and a stop for retaining said interchangeable inserts in said recess.

2. The system for molds according to claim 1, wherein said letters and/or numbers indicate a day, a month, a week and/or a year number.

3. The system for molds according to claim 1, wherein said interchangeable inserts are removably mounted on said support.

4. The system for molds according to claim 3, wherein said support comprises a housing provided with a locking element, to lock said inserts in position.

5. The system for molds according to claim 4, wherein said housing extends to the end of the support farthest from a shaft.

6. The system for molds according to claim 5, wherein said locking element is placed centered in said housing.

7. The system for molds according to claim 5, wherein said inserts comprise a cavity complementary to said locking element.

8. The system for molds according to claim 1, wherein the marking element comprises two or more interchangeable inserts.

9. The system for molds according to claim 1, comprising a storage element for the interchangeable inserts.

10. The system for molds according to claim 9, wherein said storage element comprises a storage area with a profile complementary to a cavity of each of the interchangeable inserts.

11. The system for molds according to claim 4, wherein one or more of the locking element, the handling tool and the storage element comprise one or more magnets.

12. The system according to claim 1, wherein said marking element is movable between a use position and a position for removal and placement of the interchangeable inserts.

13. The system according to claim 1, wherein the handling tool includes a first portion extending in a longitudinal direction of the handling tool and a second portion extending in the longitudinal direction, the stop of the handling tool being inseparably connected to the second portion and having a length in the longitudinal direction sufficiently short to expose a cavity of each of the interchangeable inserts that are retained in the recess.

14. The system according to claim 1, wherein the handling tool includes a first portion having a first length in a longitudinal direction of the handling tool and a second portion having a second length in the longitudinal direction, the stop of the handling tool having a third length in the longitudinal direction, and the first length is greater than a sum of the second length and the third length.

15. The system according to claim 13, wherein a horizontal surface of the first portion is adjacent to a side surface of the second portion, and the stop protrudes from the side surface of the second portion in the longitudinal direction so as to define the recess for placing said interchangeable inserts.

16. The system according to claim 1, wherein the handling tool removes said interchangeable inserts from a storage element before placing said interchangeable inserts into the support of the marking element.

17. The system according to claim 1, wherein the marking element is configured to be in a first position to come out of a housing in the mold when said interchangeable inserts are placed into or removed from the support of said marking element, or in a second position of use after said interchangeable inserts have been changed.

18. The system according to claim 15, wherein the stop overlaps the first portion when seen in a top view of the handling tool.

* * * * *